June 12, 1962 YOSHIRO NAKAMATSU 3,038,370
APPARATUS FOR PHOTOGRAPHING AND PROJECTING
A PICTURE OF A GREAT WIDTH
Filed Jan. 4, 1957
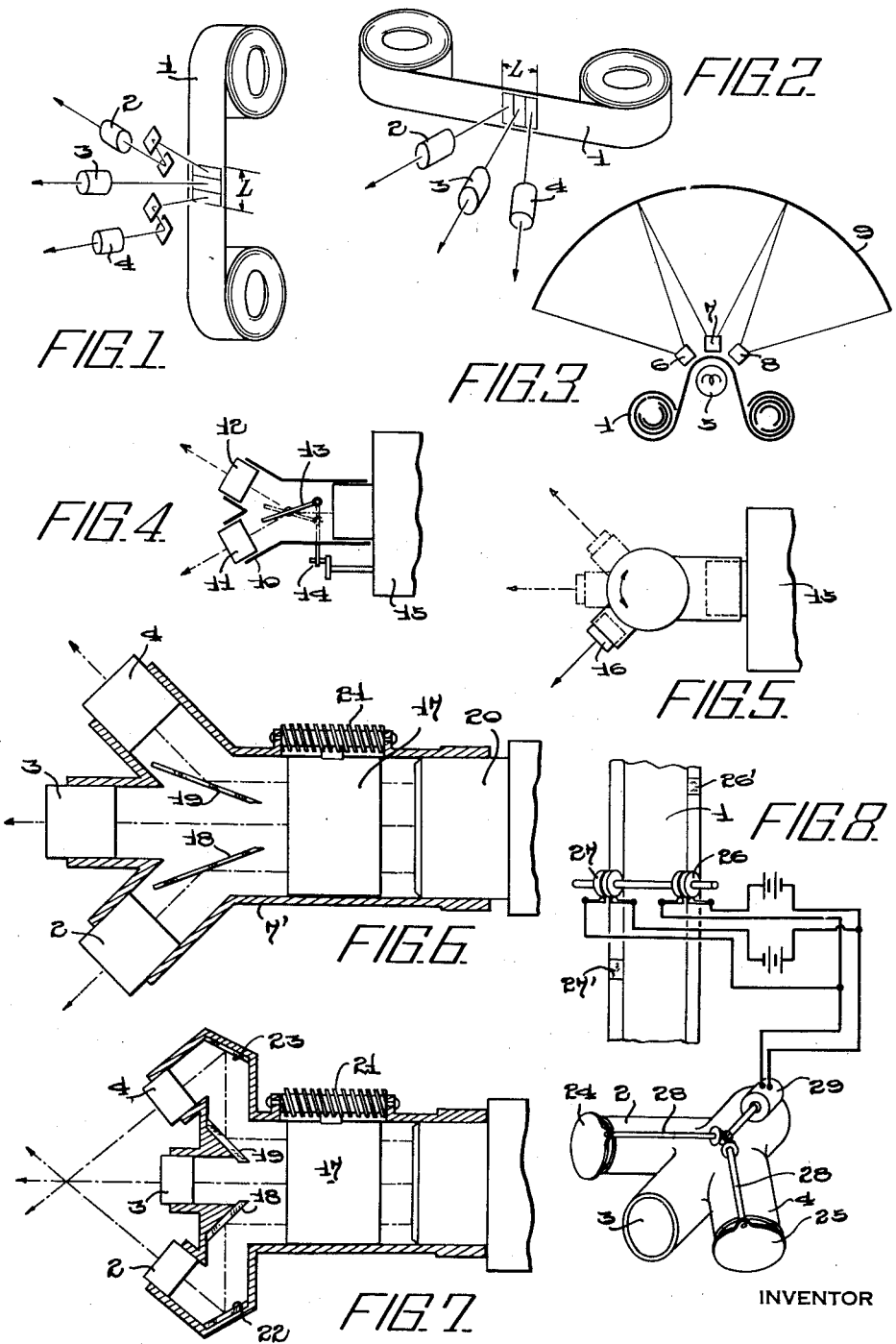
INVENTOR
BY
ATTORNEY

United States Patent Office 3,038,370
Patented June 12, 1962

3,038,370
APPARATUS FOR PHOTOGRAPHING AND PROJECTING A PICTURE OF A GREAT WIDTH
Yoshiro Nakamatsu, 2—62 Shimouma-cho, Setagaya-ku, Tokyo, Japan
Filed Jan. 4, 1957, Ser. No. 632,490
Claims priority, application Japan Jan. 9, 1956
2 Claims. (Cl. 88—16.6)

This invention relates to a method and an apparatus for cinematographing a picture having a great width. The word "picture" or a "photograph" in this specification and claims means a photograph as well as a cinematograph, particularly pictures having a great width as those for Cinemascopes, Cineramas, or even greater.

It is general practice to use a plurality of cameras for taking a picture of a great width when it is desired to take a photograph of an object having a great width, and to place these cameras in different angles and taking the photograph in sections which form in combination a complete continuous picture when combined, and to project these sections on a screen using a plurality of projectors to form a complete continuous image. In such a method, it is natural not only that the cost of equipment is increased since it requires a number of cameras and projectors, but also that it requires much care or complicated devices for obtaining a continuous perfect picture or image by correct combination of sections.

According to this invention, these difficulties as mentioned above may be eliminated by forming a picture on one single film and projecting said picture on a screen by the use of a simple device by simple operation.

The method of this invention for cinematographing a picture having a great width comprises dividing said picture into sections and taking photographs of said sections simultaneously on a single film to form a complete continuous picture thereon, and projecting said photograph having a great width on a screen by projecting all sections simultaneously or by projecting said sections successively to form a complete continuous picture on a screen.

Further characteristic and advantages of this invention will become apparent as the descriptions with referenc to accompanying drawings which illustrate some embodiments of this invention proceed, wherein:

FIG. 1 is a diagrammatic view showing the method of taking a cinematograph according to this invention in vertical direction;

FIG. 2 is a similar view as FIG. 1, but taking a cinematograph in horizontal direction;

FIG. 3 is a diagrammatic view showing the method of projecting a cinematograph according to this invention;

FIG. 4 is a diagrammatic view of an attachment according to this invention;

FIG. 5 is a diagrammatic view of another attachment according to this invention;

FIG. 6 is a diagrammatic view of another attachment of outwardly expanding type according to this invention;

FIG. 7 is a diagrammatic view of another attachment of inwardly converging type according to this invention; and FIG. 8 is a diagrammatic view of an apparatus for controlling the width of a picture as desired.

In FIG. 1, three lenses 2, 3 and 4 are arranged in such a way as to project the images of three divided sections of an object or a scene on a film 1 within a range of length L in continuous successive relation to form a complete continuous image of an object or a scene of a great vertical length. The film 1 runs in vertical direction and the picture has a greater length in vertical direction. FIG. 2 is a similar arrangement in which the film 1 runs in horizontal direction and the picture has a greater length in horizontal direction. Generally, the arrangement of FIG. 2 is preferable since it is desired in most cases to have a picture having a great width in lateral direction. The length of L, is a unit length of the delivery of the film 1, and if the length L is too great, there will be difficulty in delivering operation of the film 1. However, such a difficulty can be easily overcome by contracting the image projected on the film in the direction of delivery, namely in vertical direction in FIG. 1 and in horizontal direction in FIG. 2.

FIG. 3 illustrates the method projecting a picture as illustrated in FIGS. 1 and 2 on a screen according to this invention. The picture of the film 1 produced as shown in FIGS. 1 or 2 is projected on a screen 9 by a single projector adapted to project light in several directions 6, 7 and 8 from a light source 5. When the picture of the film 1 is contracted in one direction, the projector is of such a nature as to restore the contracted picture to the original normal size. The projector may be of a type of special design for projecting the film according to this invention, but also a conventional projector may be used satisfactorily for the projection by the use of a simple attachment of this invention. FIG. 4 illustrates one of the embodiments of such an attachment. According to this embodiment, an attachment shown in general by 10 is attached on a conventional projector 15. The attachment 10 comprises two projection lenses 11 and 12 which are arranged to project a part of the image on the film alternatively in directions 11 and 12 under the action of a reflection mirror 13 which is moved by a mechanism 14 interlocked with the operation of the projector 15 so that the synchronized movement of the mirror is secured. By this operation, the images on the right and the left sides on the screen will be formed intermittently but due to the remaining effect of the image on eyes of the spectator, the picture on the screen can be seen as a unit continuous picture.

FIG. 5 illustrates another attachment for the same purpose. In this embodiment, the attachment has a single projection lens which swings as shown by the arrow in the drawing to project the parts on the right and the left of the picture of a film alternatively on a screen. The swinging motion of the attachment 16 is of course synchronized with the operation of the projector 15 as in the case of FIG. 4.

FIG. 6 is still another attachment for taking a photograph or projecting a photograph according to this invention. The embodiment will be explained as the case of taking a photograph. An attachment has a housing 7′ and three objective lenses 2, 3 and 4 are mounted in front of the housing 7′ which has in turn a lens 17 on the other end. The objective lenses 2, 3 and 4 may be ordinary lenses or anamorphic lenses. The light passed through the objective lenses 2 and 4 are reflected by mirrors 18 and 19 to pass through the lens 17 while the light passed through the objective lens 3 reaches directly the lens 17 and then these lights proceed to the camera 20 to form a picture of a great width on a film. The lens 17 may be an aberration lens, a distance adjustable lens, or an anamorphic lens. For the adjustment of the distance, a device 21 is mounted on the housing 7′.

When this apparatus is used for the projection of the picture, the picture of the film is projected through the lens 17 and the central section is projected through the lens 3 while the sections on both sides are reflected by mirror 18 or 19 to pass through the lens 2 or 4.

FIG. 7 is an attachment of another type whereby the light is inwardly converged. It will be apparent from the drawing that the light passing through the objective lenses 2, 3 and 4 will be collected to the lens 17 directly or after being reflected by mirrors 22 and 18 or by mirrors 23 and 19.

When the attachment as shown in FIGS. 6 and 7 is used:

(a) The contraction of the picture or the extension of the contracted picture can be effected twice, if desired, by two lenses 2, 3 or 4 and 17;

(b) The adjustment of the distance may be effected by the adjustment of a single lens 17; and (c) The aberration desired can be achieved by proper selection of the single lens 17.

It may be desired sometimes to have a picture having a width limited or extended. According to this invention, such contraction and extension can also be obtained easily. FIG. 8 illustrates one of the embodiments of such a device. Shutters 24 and 25 are provided in front of the objective lenses 2 and 4 respectively for the purpose as mentioned above to limit the flux of light. The shutters 24 and 25 are controlled by a motor 29 through their axial shafts 28 which are engaged with a gear fixed on the shaft of the motor 29. When the motor 29 is operated, the shutters 24 and 25 are operated to close the passages of light through the lenses 2 and 4 while light passing through the lens 3 is allowed to reach the screen. Thus a contracted picture is projected on the screen. The control of the shutters may be effected, for example, by providing on the edges of the film 1 at proper points conductive foils 26', 27' which cooperate with switch 26 or 27, which switch being in contact with the edge of the film 1 respectively. When the film 1 proceeds and the foil 26' comes in contact with the switch 26, the motor 29 is operated to drive the shutters 24 and 25 to close the lenses 2 and 4 and then the motor is stopped. In this way the picture on the screen is contracted. As the film continues to proceed and the foil 27' on the opposite edge comes into contact with the switch 27, the motor 29 is operated in reversed direction to drive shutters 24 and 25 to open the lenses 2 and 4 and then is stopped. Thus the picture on a film may be restored to the extended picture. The arrangement of the circuits for operations as described above may be easily contemplated by those experienced in the art, and hence it is not dwelt upon herein.

According to this invention as described above, the image or an object of a great width may be divided into sections by using a plurality of lenses and a picture of a great width is formed on a film as one unit continuous picture and said picture may be projected on a screen by using a plurality of lenses. The width of the picture on a film may be contracted to a desired value, if necessary, by using a proper anamorphic lens or lenses taking into consideration the rate of delivery of the film in a camera or a projector. To summarize, according to this invention:

(1) A picture of a great width can be taken or projected by using only one film and one camera or projector;

(2) Accordingly, the operation of taking a photograph or a film of cinematograph of a great width and projecting such a photograph or a film on a screen is easy and the expense for the equipment as well as for the operation can be greatly economized;

(3) The picture is set in one film as one unit picture, the joints between the sections of the parts of the picture being correctly fixed, and this picture is projected by a single projector, and hence there is no necessity of adjusting the joints of the sections during projection, while in the conventional operation of Cinerama or the like, three separate projectors and three separate films are used in order to project an image of a great width on a screen and careful attention and adjustment for maintaining the joints correctly is required;

(4) The method of this invention is applicable to a camera or a projector of the conventional design easily by using an attachment of simple construction; and (5) The picture on the screen may be contracted and extended as desired by a simple device, for example, as shown in FIG. 8.

While it is described in the above with regard to cinematographing a picture having a great width but not such an extent to have 360°, it is to be understood that cinematographing a picture of 360° can be made by the use of a single projector or a camera by the same principle.

I claim:

1. Motion picture apparatus for use with film and comprising an optical system including a central anamorphic lens and side anamorphic lenses located on opposite sides of said central lens, said system having a direction of contraction parallel to a plane containing the optical axes of all said lenses and being adapted to form a continuous picture of large width in combination, the lenses having their own respective optical axes which are spaced from one another; and a control system comprising two shutters which are located respectively in front of said side lenses and operation means coupled to and adapted to operate the shutters, said operation means including switch means coupled to and adapted to operate the shutters and contacts operatively engageable with said switch means to operate the same, said contacts being supported on said film.

2. Apparatus as claimed in claim 1, wherein said switch means comprises two sets of contacts, said apparatus further comprising a motor operatively coupled to said shutters for operating the same, and electrical power sources coupled by said sets of contacts to said motor in oppositely polarized relation to drive said motor reversibly, the first said contacts connecting the contacts of said sets selectively according to the movement of said film.

References Cited in the file of this patent

UNITED STATES PATENTS

| 1,112,270 | Currie | Sept. 29, 1914 |
| 1,196,066 | Alberini | Aug. 29, 1916 |
| 1,489,988 | Dickinson | Apr. 8, 1924 |
| 1,735,109 | Eliel | Nov. 12, 1929 |
| 1,894,265 | Chretian | Jan. 17, 1933 |
| 1,963,194 | Fenner et al. | June 19, 1934 |
| 1,964,968 | Warmisham | July 3, 1934 |
| 1,984,620 | Anderson | Dec. 18, 1934 |
| 2,251,177 | Thomas | July 29, 1941 |
| 2,299,682 | Conant | Oct. 20, 1942 |
| 2,304,434 | Ayres | Dec. 8, 1942 |
| 2,343,046 | Stefano | Feb. 29, 1944 |
| 2,365,212 | Oriol | Dec. 19, 1944 |
| 2,438,137 | Waller et al. | Mar. 23, 1948 |
| 2,737,082 | Dowling | Mar. 6, 1956 |
| 2,737,083 | Dowling | Mar. 6, 1956 |
| 2,782,699 | Vanderhooft | Feb. 26, 1957 |

FOREIGN PATENTS

| 23,396 | Great Britain | of 1907 |
| 204,141 | Great Britain | Sept. 27, 1923 |
| 282,422 | Great Britain | Oct. 25, 1928 |
| 397,949 | France | May 21, 1909 |
| 458,586 | France | Aug. 11, 1913 |
| 657,324 | France | Jan. 15, 1929 |
| 1,090,497 | France | Oct. 20, 1954 |
| 1,096,994 | France | Feb. 9, 1955 |